Figure 1:
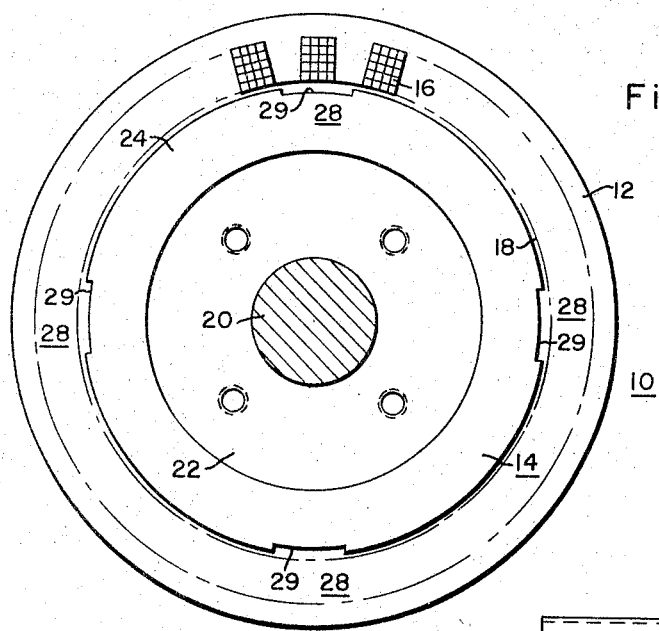

May 9, 1967 F. J. JOHNS ET AL 3,319,099
HYSTERESIS MOTOR HAVING MODIFIED TORQUE CHARACTERISTICS
Filed July 1, 1964 2 Sheets-Sheet 1

INVENTORS
Francis J. Johns and
Donald S. Scott
BY
ATTORNEY

United States Patent Office 3,319,099
Patented May 9, 1967

3,319,099
HYSTERESIS MOTOR HAVING MODIFIED
TORQUE CHARACTERISTICS
Francis J. Johns, Buffalo, and Donald S. Scott, Snyder, N.Y., assignors to Westinghouse Electric Corporation, Pittsburgh, Pa., a corporation of Pennsylvania
Filed July 1, 1964, Ser. No. 380,989
4 Claims. (Cl. 310—163)

The present invention related to hysteresis motors and more particularly to such motors in which the torque-speed characteristic is modified to achieve a marked drop in speed at pull-out torque.

In a hysteresis motor, the rotor normally comprises a non-magnetic arbor or quill about which there is disposed a sleeve formed from a material having a relatively high hysteresis loss charactaeristic. Induction motor torque produced by eddy currents in the hysteresis sleeve, and to some extent hysteresis torque, accelerate the rotor from rest to synchronous speed. At synchronous speed, the induction motor torque drops to zero since the rotor is then rotating in synchronism with the rotating air gap flux, and synchronous motor torque then provides the energy needed for driving the motor load. The development of hysteresis torque below synchronous speed resides in the fact that the hysteresis sleeve magnetization angularly lags the rotating magnetic flux in the rotor-stator air gap, and at synchronism the hysteresis material is permanently magnetized and synchronous motor torque is developed.

Normally, the torque-speed characteristic of a hysteresis motor rises smoothly from zero speed to synchronous speed and, at pull-out from synchronism drops smoothly from synchronous to lower speeds. There are some applications, however, notably in the manufacture of textiles or fibers, where it is desirable to use hysteresis motors and simultaneously it is desirable that the motor exhibit a sharp drop in speed at the instant that it pulls out from synchronism. A speed decrease of such distinct character can be useful, for example, in detecting abnormal motor load conditions, or it can be useful in other respects.

In accordance with the principles of the present invention, a hysteresis motor comprises a rotor which is cooperatively disposed within a stator and which is structurally arranged to interact with the rotor-stator air gap flux and produce a torque-speed characteristic of the type described. The rotor preferably includes a non-magnetic quill disposed on a shaft, and a generally cylindrical hysteresis sleeve is disposed about the quill. In order to produce a distinct drop in speed at pull-out torque, axial reluctance modifying means are provided along the outer periphery of the hysteresis rotor sleeve. Preferably, the reluctance modifying means include one axial slot for each motor pole, and the slots preferably extend radially inwardly from the sleeve outer periphery and preferably are symmetrically distributed about the generally circular periphery of the hysteresis rotor sleeve.

It is therefore an object of the present invention to provide a novel hysteresis motor having an irregular torque-speed characteristic.

Another object of the invention is to provide a novel hysteresis motor which sharply decreases in speed at pull-out torque.

A further object of the invention is to provide a novel hysteresis motor which utilizes reluctance torque at synchronous speed so that at pull-out torque the motor experiences a sharp drop in speed.

Figure 2:
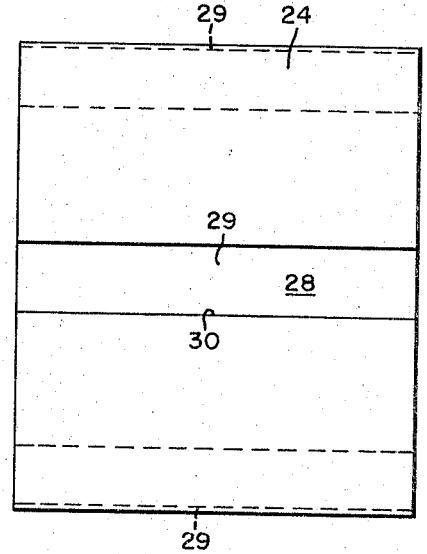
Figure 3:
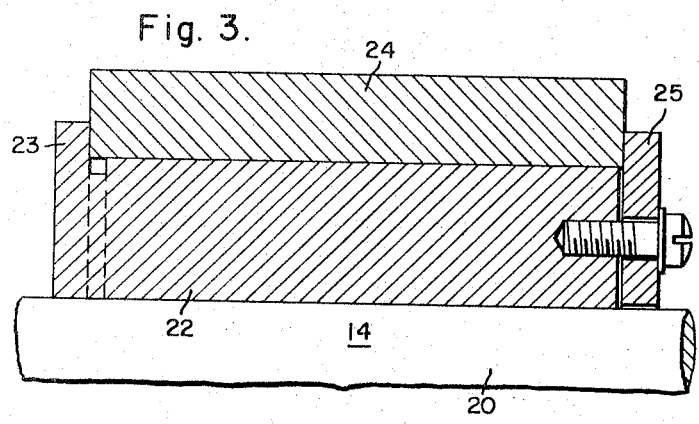
Figure 4:
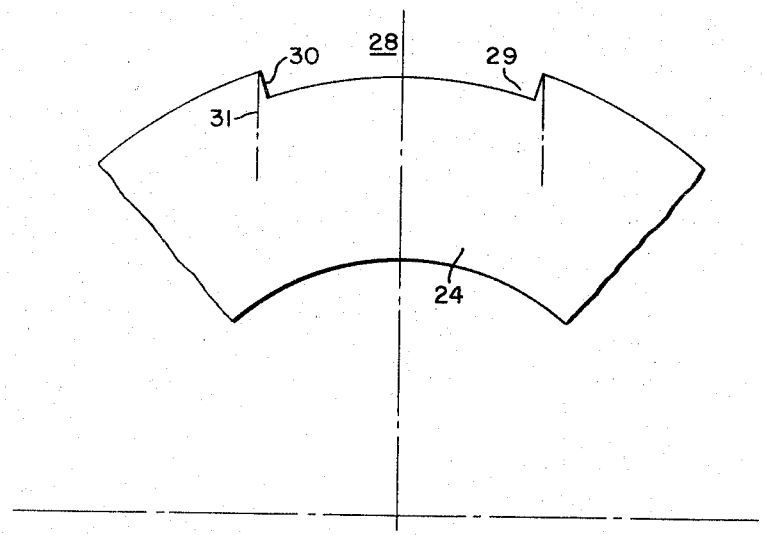
Figure 5:
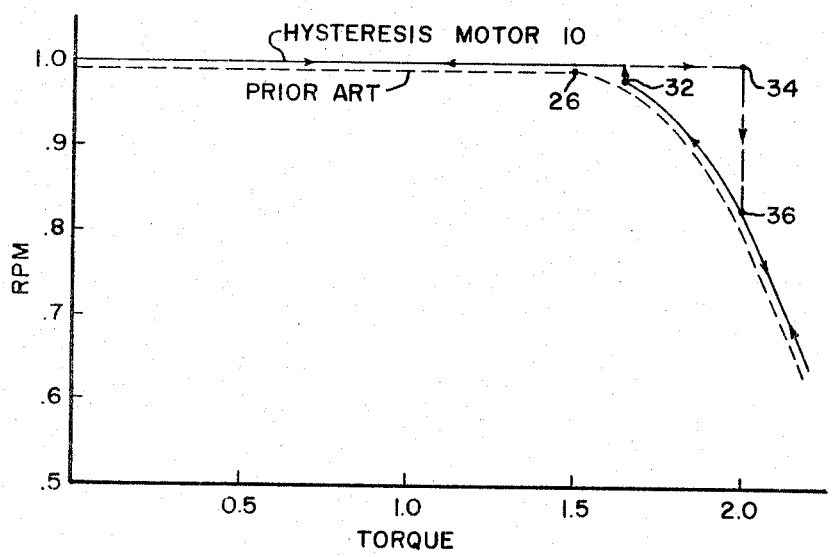

These and other objects of the invention will become more apparent upon consideration of the following detailed description along with the attached drawings, in which:

FIGURE 1 shows a cross-section of a hysteresis motor constructed in accordance with the principles of the invention;
FIG. 2 shows an elevational view of a hysteresis rotor sleeve employed in the motor of FIG. 1;
FIG. 3 shows an axial section of the rotor employed in the motor of FIG. 1;
FIG. 4 shows an enlarged fragmentary end view of the rotor sleeve shown in FIG 2; and
FIG. 5 shows the torque-speed characteristic of the hysteresis motor of FIG. 1 and in addition the torque-speed characteristic of a prior art hysteresis motor.

More specifically, there is shown in FIG. 1 a four pole hysteresis motor 10 having a stator 12 and rotor 14 arranged in accordance with the principles of the invention. Preferably, the stator 12 is provided with three-phase winding means 16 which produces a rotating substantially sinusoidal magnetic flux wave in air gap 18. However, other winding arrangements can be employed on the stator 12, for example, a single-phase or two-phase winding can be provided with suitable provision being made for the required rotating flux wave in the air gap 18.

The rotor 14 is mounted on a suitable shaft 20 which in turn is suitably supported by means of bearings (not shown) on a motor frame (not shown). On the shaft 20, there is provided a non-magnetic quill 22 which can be solid or otherwise structurally formed from stainless steel or other structural material having a magnetic permeability of suitably low value. A generally cylindrical hysteresis sleeve 24 is disposed peripherally about the non-magnetic quill 22, and it is preferably solid to promote eddy current start-up torque and can be formed from a material such as an iron-cobalt alloy. The sleeve 24 can be fitted over the non-magnetic quill 22 by a shrink fitting process, if desired, and rigidly held thereon between end flange 23 of the quill 22 and a bolted end plate 25. Although the non-magnetic quill 22 is not required, it is preferred since it effectively increases the concentration of magnetic flux in the sleeve 24 and since the shaft 20 then need not be formed from a non-magnetic material.

Normally, when the stator winding 16 is suitably energized, accelerating torque for the motor 10 is produced principally by eddy currents flowing in the hysteresis sleeve 24. As shown in FIG. 5 by the prior art curve, the net starting torque in a hysteresis motor of conventional design brings the motor up to synchronous speed along a smooth curve. Similarly, at pull-out from synchronism (26), the hysteresis motor of conventional design decelerates along a smooth curve. At synchronous speed, the hysteretic lag angle existing between the magnetized rotor sleeve and the rotating air gap magnetic flux determines the torque developed by the motor for driving any suitable load (not shown) connected to the shaft 20.

To provide for a sharp drop in speed of the motor 10 at pull-out torque, the hysteresis sleeve 24 is provided with reluctance modifying means or axial slot means 28 extending, in depth, radially inwardly from the sleeve outer periphery. Preferably, a single slot 29 is provided to correspond with each magnetic stator pole and in this case four slots 29 are thus provided. However, in some cases, plural parallel slots can be provided to correspond with each stator pole or fewer or other distributions or numbers of slots can be provided about the outer periphery of the hysteresis sleeve 24. Further, outwardly projecting ribs (not shown) can be employed in place of the slots 29 or the hysteresis sleeve 24 can be provided with flat surface portions in place of the slots 29.

As indicated in FIG. 4, axial edges 30 of the slots 29 can extend radially inwardly from the sleeve outer periphery, but, if desired for manufacturing facility, slot edges 31 can be provided substantially parallel to respective referencee center diameter lines extending through the center of the respective slots 29. As one geometry example, the total arcuate extent of each slot 29 can be 18 degrees and the depth can be .01 inch for a hysteresis sleeve having a radial thickness of 4 inches.

The reluctance modifying means or slot means 28 produce a salient pole effect since the air gap reluctance at any given air gap crossover point varies as a function of the angular position of the rotor 14. Hence, at synchronous speed, a reluctance torque is developed to aid in maintaining rotor-stator pole alignment and increased torque accordingly is required for pull-out from synchronism.

The overall torque-speed characteristic for the motor 10 is shown in FIG. 5 where it can be compared with the torque-speed characteristic of the conventional hysteresis motor. Thus, the speed of the motor 10 rises smoothly after starting until it reaches point 32 where sufficient torque is developed to bring the rotor 14 sharply up to synchronous speed. The motor 10 then operates at synchronous speed, but can be pulled out from synchronism by an overload torque or by other means. The torque at which pull-out occurs is relatively increased to point 34 by virtue of the reluctance torque produced by the rotor hysteresis sleeve slots 29. Thus, when the load torque reaches the exemplary value two, the motor 10 pulls out from synchronism and does so with a sharp drop in speed to point 36 on the motor characteristic curve. As already indicated, this feature in the operating characteristic of the motor 10 can be useful in a number of applications.

The foregoing disclosure has been presented as an illustration of the invention. Accordingly, it is desired that the invention not be limited by the embodiments described, but rather, that it be accorded an interpretation consistent with the scope and spirit of its broad principles.

What is claimed is:

1. A hysteresis motor comprising a rotor and a stator suitably energizable to produce a rotating magnetic flux wave in a rotor-stator air gap, said rotor having a continuous generally cylindrical hysteresis member of substantial radial thickness mounted non-magnetically on a shaft, said hysteresis member having relatively shallow slot means extending axially on the surface thereof and spaced about the generally circular hysteresis member periphery so as to increase the motor pull-out torque and characterize said motor with a sharp drop in speed at pull-out torque.

2. A hysteresis motor comprising a rotor and a stator suitably energizable to produce a rotating magnetic flux in a rotor-stator air gap, said rotor having a continuous generally cylindrical hysteresis member of substantial thickness mounted non-magnetically on a shaft, said hysteresis member having a plurality of relatively shallow slots on the surface thereof corresponding in number to the number of magnetic stator poles, each of said slots extending axially of said hysteresis member and said slots being symmetrically spaced about the generally circular hysteresis member periphery so as to increase the motor pull-out torque and characterize said motor with a sharp drop in speed at pull-out torque.

3. A hysteresis motor comprising a rotor and a stator suitably energizable to produce a rotating magnetic flux wave in a rotor-stator air gap, said rotor having a substantially non-magnetic quill mounted on a shaft, a continuous solid cylindrical hysteresis member of substantial radial thickness mounted peripherally about said non-magnetic quill, said hysteresis member having shallow slot means extending axially on the surface thereof and spaced about the generally circular hysteresis member periphery so as to increase the motor pull-out torque and characterize said motor with a sharp drop in speed at pull-out torque.

4. A hysteresis motor comprising a rotor and a stator suitably energizable to produce a rotating magnetic flux wave in a rotor-stator air gap, said rotor having a substantially non-magnetic quill mounted on a shaft, a continuous solid cylindrical hysteresis member of substantial radial thickness mounted on said non-magnetic quill, said hysteresis member having a plurality of shallow slots on the surface thereof corresponding in number to the number of magnetic stator poles, each of said slots extending axially of said hysteresis member and said slots being spaced symmetrically about the generally circular hysteresis member periphery so as to increase the motor pull-out torque and characterize said motor with a sharp drop in speed at pull-out torque.

References Cited by the Examiner

UNITED STATES PATENTS

| | | | |
|---|---|---|---|
| 562,686 | 6/1896 | Wightman | 310—163 |
| 2,157,435 | 5/1939 | Reid et al. | 310—163 |
| 2,160,076 | 5/1939 | Lux | 310—163 |

MILTON O. HIRSHFIELD, *Primary Examiner.*

L. L. SMITH, *Assistant Examiner.*